(12) United States Patent
Nakamura

(10) Patent No.: US 6,628,848 B1
(45) Date of Patent: *Sep. 30, 2003

(54) IMAGE READING APPARATUS

(75) Inventor: Hiroaki Nakamura, Kanagawa (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/213,899

(22) Filed: Dec. 17, 1998

(30) Foreign Application Priority Data

Dec. 17, 1997 (JP) ............................................. 9-348051

(51) Int. Cl.⁷ ............................. G06K 9/00; G06K 7/00; G06K 7/10

(52) U.S. Cl. ...................... 382/318; 382/312; 235/462

(58) Field of Search ................................. 382/312, 313, 382/315, 317, 318, 319, 321, 309; 348/270, 266; 358/512, 515, 505; 250/226, 578.1; 235/462, 439, 465

(56) References Cited

U.S. PATENT DOCUMENTS

| | | | | |
|---|---|---|---|---|
| 3,632,203 A | * | 1/1972 | Kolibas ...................... 399/206 |
| 4,097,904 A | * | 6/1978 | Wada ......................... 358/484 |
| 4,734,782 A | * | 3/1988 | Maeshima .................. 358/280 |
| 4,926,041 A | * | 5/1990 | Boyd ......................... 250/226 |
| 4,974,068 A | * | 11/1990 | Hiramatsu et al. .......... 358/506 |
| 5,194,960 A | | 3/1993 | Ota ............................ 348/362 |
| 5,221,835 A | * | 6/1993 | Setani ...................... 250/208.1 |
| 5,339,107 A | * | 8/1994 | Henry et al. ................ 348/270 |
| 5,410,347 A | * | 4/1995 | Steinle et al. ............... 348/270 |
| 5,844,226 A | * | 12/1998 | Suzuki ....................... 235/462 |

FOREIGN PATENT DOCUMENTS

| | | |
|---|---|---|
| EP | 0740460 A2 | 10/1996 |
| JP | 64-4166 A | 1/1989 |
| JP | 2-295371 A | 12/1990 |
| JP | 3-254584 A | 11/1991 |
| JP | 05-083626 | 4/1993 |
| JP | 06-152872 | 5/1994 |
| JP | 8-307601 A | 11/1996 |
| JP | 9-46479 A | 2/1997 |
| JP | 09-298629 | 11/1997 |
| JP | 9-326924 A | 12/1997 |

* cited by examiner

Primary Examiner—Leo Boudreau
Assistant Examiner—Duy M. Dang
(74) Attorney, Agent, or Firm—Birch, Stewart, Kolasch & Birch, LLP

(57) ABSTRACT

An image reading apparatus for reading an original image photoelectrically includes: a light source; a holding device to hold an original having the original image in a predetermined read position, a light quantity control device to control quantity of read light incident on the original image, an image sensor having a row of line sensors with regard to three primary colors or more colors, each line sensor corresponding to each color and having a plurality of photoelectric transducing elements arranged in a direction, a scanning device to relatively move the original and an optical system to an auxiliary scanning direction perpendicular to the element arrangement direction and an adjusting device to adjust read conditions at the image sensor for each line sensor independently. The image reading apparatus according to the present invention is of a digital image reading apparatus by slit scanning and can perform efficiently the appropriate image reading that is adjusted to have a wide dynamic range and a good color balance in accordance with the original image and also output a reproduced image of high quality at constant high productivity by such as a digital photoprinter.

16 Claims, 5 Drawing Sheets

IMAGE READING APPARATUS

BACKGROUND OF THE INVENTION

The present invention pertains to a technical field where image reading apparatuses are utilized for digital photoprinters for photoelectrically reading images recorded on films to obtain prints. (photographs) that are reproduced from the images.

Images recorded on photographic films (hereinafter called the films) such as negative films, reversal films and the like are mainly printed out on photosensitive material (photographic paper) by projecting the on-film image onto the photosensitive material so that the photosensitive material is subjected to surface exposure or so-called direct exposure (analog exposure).

On the other hand, printing apparatuses utilizing digital exposure have been put to practical use in recent years. More specifically, a digital photoprinter is used for printing out (finishing off) an image recorded on a film through the steps of reading the image photoelectrically, converting the read-out image into a digital signal, performing various kinds of image processing in order to obtain image data to be recorded and subjecting photosensitive material to scanning exposure by means of the recording light modulated according to the image data, to thereby record the image (latent image).

As exposure conditions at the time of printing can be determined by processing images with digital data as image data in the digital photoprinter, high-grade prints that have been unavailable until now become obtainable by such as making compensation for image fade-out and improper gradation such as washed-out highlight and dull shadow originating from backlight, electronic flashing and the like, sharpness processing, compensation for color or density failure. Moreover, a composite photograph using a plurality of images, image division, a composition of characters and the like can be attained by processing the image data. The image data processing also makes it possible to output edited/processed prints freely in accordance with an intended use.

Furthermore, the digital photoprinter makes image data applicable for other purposes than photography, since the photoprinter allows images to be outputted as prints (photographs) and also allows the image data to be not only supplied to a computer, for example, but also stored in, optical and/or magnetic recording media such as floppy disks.

Such a digital photoprinter as described above essentially comprises an image input apparatus having a scanner (image reading apparatus) for reading an image recorded on a film photoelectrically and an image-processing apparatus for subjecting the read-out image to image processing in order to provide output image data (exposure conditions), and an image output apparatus having a printer (image recording apparatus) for recording a latent image by subjecting photosensitive material to scanning exposure according to the image data outputted from the image input apparatus and a processor (developing apparatus) for subjecting the exposed photosensitive material to developing processing for printing purposes.

The operation of the scanner includes making read light emitted from a light source incident on a film to obtain projected light for carrying an image projected on, the film, effecting image formation in an image sensor such as a charge coupled device (CCD) by means of an image forming lens so as to read the image by subjecting the projected light to photoelectric conversion, performing various kinds of image processing as the occasion demands and sending data concerning the on-film image (image data signal) to the image-processing apparatus.

The operation of the image-processing apparatus includes setting image processing conditions according to the image data read by the scanner, applying image processing corresponding to the set conditions to the image data and sending output image recording data (exposure conditions) to the printer.

The operation of the printer, that is, a printer utilizing light beam scanning exposure, for example, includes modulating a light beam according to the image data sent from the image-processing apparatus, deflecting the light beam in the main scanning direction, transporting the photosensitive material in an auxiliary scanning direction perpendicular to the main scanning direction in order to form a latent image by exposing (printing) the photosensitive material, using the tight beam that carries the image therewith and performing developing processing corresponding to the photosensitive material in the processor in order to make a print (photograph) reproduced from the on-film image.

As an image reading method at a digital photoprinter, a surface exposure method, in which first a read light is irradiated all over a frame of a film, and then the projected light is read through each of red (R), green (G), and blue (B), filters interchanged each other in order by an area sensor photoelectrically, is known in the art. Another method, i.e., a slit scanning method, in which first line sensors for respective reading of R, G, and B are used, and secondly a read light in a slit formed in parallel to the extending direction (main scanning direction) of the line sensors is incident on the film, and then the film is transported (or an optical system is moved) in the longitudinal direction of the film, or in the auxiliary scanning direction perpendicular to the main scanning direction, and finally whole area of the frame of the film is read by slit scanning, is also known in the art.

The surface exposure method and the slit scanning method each have advantages and disadvantages. An area sensor is generally high in cost, since it contains a number of photoelectric transducers, and CCD cells. Particularly, if a reproduction image of high quality is required, it is necessary to employ an area sensor containing a large number of cells equal to or proportional to the squared number of the resolution, in order to read the original image in higher resolution.

Moreover, an area sensor supplied in the market as a product sometimes contains a small number of defective cells, so-called defective pixel cells, which fail to output accurate signals in accordance with a quantity of the incident light. The area sensor including the defective pixel cells is often found among the area sensors which have been produced at a some high yield rate. This necessitates a complicated correction circuit to compensate errors caused by the defective cells including defective pixels.

As a result, reading by the slit scanning method is more advantageous from the standpoint of cost.

In order to obtain a reproduction image of high quality, which properly has reproduced an original image, in the case of reading the image by the scanner, it is necessary to read a whole density range of the original image with the highest possible resolution, and it is preferable to read with the widest possible dynamic range. In order to accomplish this, for example, when a photograph film is read out, a so-called density control is performed in such a way that the image reading is carried out under a condition that an image sensor is saturated at a density just equal to or merely lower than the lowest density of the original image on the photograph film.

Moreover, when one color occupies a large area of an image, like an image of a subject taken on a green of a golf course, or an image of a person's face taken in front of wall paper with a bright color, so-called color failure occurs so that a reproduction image comes out with unnatural colors or tints. This color failure may be corrected by image processing to some extent. However, since the correction by image processing is limited, it is preferable to control color balance of the image (image data) when the original image is read. This will enable to obtain a reproduction image of high quality reliably.

Therefore, read conditions of a scanner should be controlled with regard to the density and the color balance of the original image whenever each of three colors is read, in order to obtain a reproduced image of high quality reliably. The output image data thus obtained must have a wide dynamic range and a good color balance.

At the image reading by the surface exposure, each of R, G, and B is read in order by utilizing a variable diaphragm. It is possible to read original images with a wide dynamic range of density and a good color balance by controlling the light quantity of read light when each of R, G, and B is read.

On the other hand, at the image reading by the slit scanning, it is possible to control density by controlling light quantity of read light by utilizing a variable diaphragm, since a projected light forms images on line sensors concurrently corresponding to three primary colors or more colors, but impossible to obtain a good color balance among R, C, and B.

Furthermore, a number of images are shot in succession in 24 or 36 frames, for example, on a film which is mainly used as original for a digital photoprinter. In case of, so-called, printing with film processing, prints are made by reading out each frame in order.

At image reading by the surface exposure, it is possible to determine conditions such as of a diaphragm during an interval while a frame moves to another, since the images are read at each predetermined position in order while each frame stops.

On the other hand, at image reading by the slit scanning, images are read while the film is moving, that is, while frames are moving. Moreover, it is preferable to read images without stopping the film until the image reading of the last frame is over in order to perform an efficient image reading and to put the lower possible load on the film transport system. Furthermore, it is also preferable to maintain the transport speed of a film as fast as possible within the capacity of such as image sensors and image processing in order to increase productivity. However, since a space between frames is generally so narrow as 1–2 mm, it is difficult to make a minute adjustment or control of the variable diaphragm during the interval between frames.

SUMMARY OF THE INVENTION

Accordingly, it is an object of the present invention to be capable of solving the above-mentioned problems in the art, and to provide an image reading apparatus for reading an original image by a slit scanning employing line sensors for corresponding to respective image reading of R, G, and B which are capable of reading, at high efficiency, the image that is adjusted to have a wide dynamic range and a good color balance in accordance with the original image; and also which capable of outputting a reproduced image of high quality at constantly high productivity by such as a digital photoprinter.

To achieve the above object, the present invention provides an image reading apparatus for reading an original image photoelectrically. The image reading apparatus comprises a light source for irradiating read light, a holder for holding an original having the original image in a predetermined read position, a light quantity controller for controlling quantity of read light incident on the original, an image sensor having a row of line sensors with regard to three primary colors or more colors with each line sensor corresponding to each primary color or each color and comprising a plurality of photoelectric transducing elements arranged in a direction, a scanner for relatively moving the original and an optical system in an auxiliary scanning direction perpendicular to the direction of element arrangement of the line sensor, and an adjuster for adjusting read conditions of the image sensor in each line sensor independently.

The original is preferably a long photographic strip of film. The holder and the scanner compose a film carrier. It is preferable that the carrier moves the photographic film in its longitudinal direction, coincident with the auxiliary scanning direction while holding the long photographic film on the read position. It is also preferable that the carrier can be loaded on and unloaded from a predetermined position.

It is preferable that the light quantity controller mainly controls density of the original image, while the adjuster mainly adjusts with regard to a color balance of the original image.

Moreover, the read conditions adjusted by the adjuster are with regard to the light quantity. Resolving power of the adjustment by the adjuster is preferably higher than that of the light quantity control by the light quantity controller.

Furthermore, the apparatus preferably has a color adjuster for adjusting color components of the read light.

Furthermore, the light quantity controller is preferably a diaphragm. The line sensor is preferably a line CCD sensor. The adjuster preferably adjusts an accumulated time of the line CCD sensor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will be explained in more detail in the following with reference to the drawings in which.

DETAILED DESCRIPTION OF THE INVENTION

A detailed description will subsequently be given of the preferred embodiment of an image reading apparatus according to the present invention with reference to the accompanying drawings.

Figure 1:
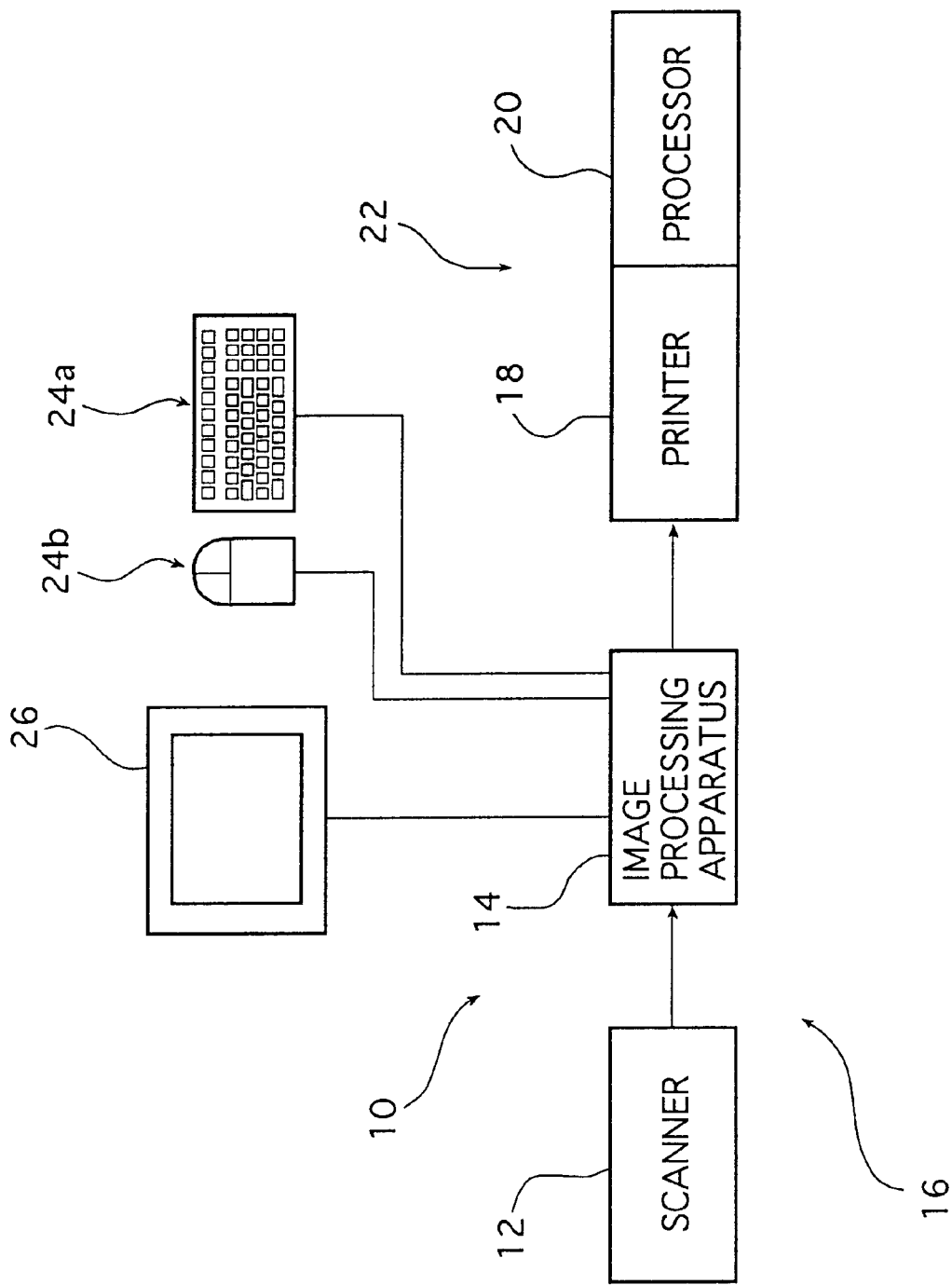
FIG. 1 is a block diagram of an embodiment of a photograph printing and developing machine utilizing an image reading apparatus according to the present invention.

FIG. 1 is a block diagram of a photograph printing and developing machine utilizing an image reading apparatus according to the present invention.

A photograph printing and developing machine 10 shown in FIG. 1 is the aforesaid digital photoprinter and comprises an input apparatus 16 having a scanner 12 for reading photoelectrically an image taken on a film F and an image-processing apparatus 14 for processing the image data read by the scanner 12 with given conditions to output image data. It further includes an output apparatus 22 having a printer 18 for recording a latent image by subjecting photosensitive material (photographic paper) to scanning exposure with a light beam which is modulated according to the image data outputted from the image-processing apparatus 14 and a processor 20 for subjecting the exposed photosensitive material to a wet developing or a dry processing in order to output a print (finishing off).

Furthermore, a keyboard 24a and a mouse 24b for entering (setting) various conditions, selection and designation of a process, designation of color/density compensation and the like and a display 26 for displaying the image read by the scanner 12, designation of various operations, setting of various conditions/registered screen and the like are connected to the image-processing apparatus 14.

Figure 2:
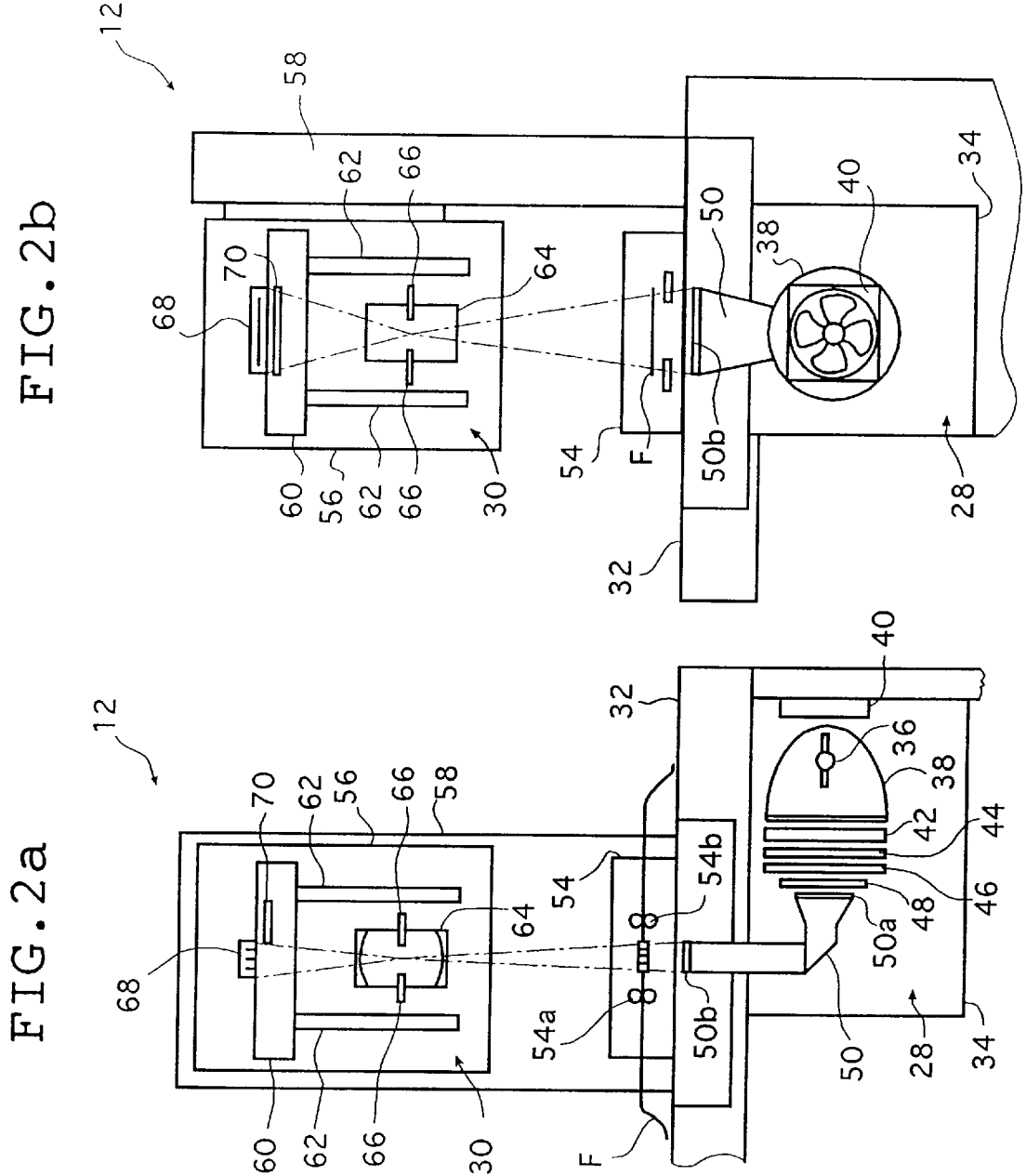
FIG. 2a is a schematic elevational view of a scanner of the photograph printing and developing machine shown in FIG. 1.
FIG. 2b is a schematic side view thereof.

FIGS. 2a and 2b are schematic diagrams of the scanner 12. FIG. 2a is an elevational view of the scanner 12, whereas FIG. 2b is a side view thereof.

The scanner 12 comprises a light source section 28 and a read section 30.

The light source section 28 is contained in a casing 34 under a work table 32 of the scanner 12 (input apparatus 16). A read light source 36 is disposed on the right-hand side (viewed in FIG. 2a) of the casing 34. As the light source 36, various light sources can be utilized for ordinary photoelectric image input apparatuses such as a halogen lamp, a metal halide lamp and the like as long as the light source has a sufficient quantity of light. A reflector 38 enabling the light emitted from the light source 36 to be efficiently incident on the film F is disposed around the light source 36. A cooling fan 40 for cooling and keeping the interior at a predetermined temperature is also disposed in the casing 34.

Moreover, a UV/IR cut-off filter (ultraviolet light, and infrared light cut-off device) 42 for cutting off lights having wavelengths in ultraviolet and infrared zones in order to improve read precision by preventing the temperature of the film F from rising, first CC filter 44, second CC filter 46, a variable diaphragm 48, and a light diffusion box 50 are arranged in the downstream direction (hereinafter called the downstream) of the path, which the light emitted from the light source 36 travels along.

The first and second CC filters are employed to adjust a difference between scanners 12 by adjusting color components of light (read light) emitted from the light source 36, in order to perform an appropriate image reading.

For example, color components (light intensity in each band of wavelengths) of the light emitted from the same type of light source 36 are not completely the same. Some light source, for example, has a high intensity in an R band, and the other has a high intensity in a G band. Moreover, an image reading is performed by three line CCD sensors in an image sensor 68 of a scanner 12. Each of three line CCD sensors reads a corresponding image each of red (R), green (G), and blue (B). Since there is a difference in sensitivity among line CCD sensors, which are employed as image sensors 68, errors in measurements appear such as in a manner that some sensors sense R at a higher value than the proper value, but B at a higher value than the proper value.

The first CC filter 44 and the second 2 CC filter 46 are color filters each having anyone of R, G, and B colors (but the fist CC filter 44 and the second CC filter 46 respond to different colors), which correct instrumental errors of scanners inherent to each constituent by controlling color components.

The first CC filter 44 and the second CC filter 46 are color filters each having anyone of R, G, and B colors (but the fist CC filter 44 and the second CC filter 46 respond to different colors), which correct instrumental errors of scanners inherent to each constituent by controlling color components.

A Constituents of the first CC filter 44, and the second CC filter 46 are not limited. It is possible to employ various kinds of constituents as far as they can control the light intensity of each color of R, G, and B in the optical path of the read light. Samples of the CC filters preferably illustrate a color filter plate which changes transparent density either continuously or in steps, a turret with a plurality of color filters of different density in its through hole, exchangeable color filter plates having different densities each other which are previously prepared and a color filter plate which may control the rate of appearance in the optical path.

The variable diaphragm 48 is used for adjusting the quantity of read light.

Specifically, the variable diaphragm 48 is controlled to have a stopping value determined in accordance with image read conditions given for pre-scanning, which will be mentioned below, when the pre-scanning is performed. The variable diaphragm 48 is also controlled to have a stopping value determined in accordance with such as minimum density of an image (an original image) of a frame to be readout a film F, taking into consideration image data obtained at the time of pre-scanning, when the main scanning for obtaining an output image is performed. In this case, the variable diaphragm 48 mainly performs the above mentioned density control in a manner that the quantity of the read light is controlled in accordance with density of an original image.

Figure 3:
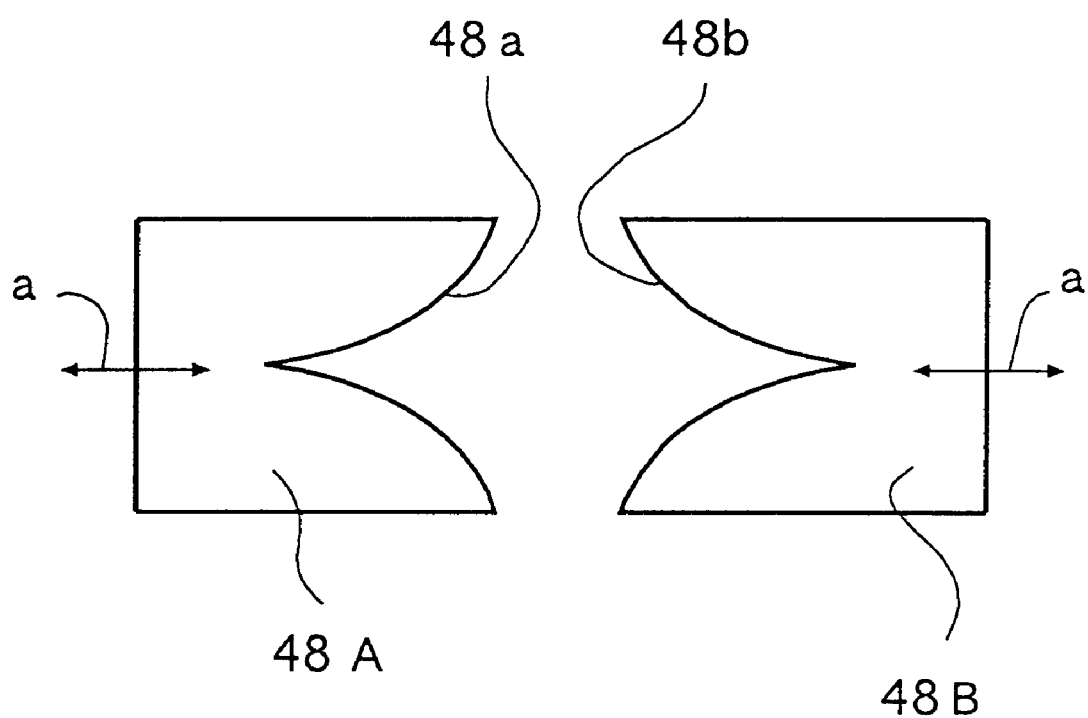
FIG. 3 is a conceptual drawing of a variable diaphragm disposed in the scanner shown in FIGS. 2a and 2b.

As shown in FIG. 3, the variable diaphragm 48 as an example essentially consists of two pieces of plate members 48A, 48B. They are disposed on a plane perpendicular to an optical axis facing with each other with the optical axis in between. Plate members 48A, 48B are arranged slidably so that they may be brought into contact with each other and separated from each other. Cutouts 48a, 48b are each formed in both plate members 48A, 48B in such a manner that the areas of the plate members 48A, 48B gradually increase in their sliding directions (directions indicated by a double-headed arrow a) from their facing sides.

Consequently, the quantity of light passing through the variable diaphragm 48, that is, the quantity of read light can be adjusted by separating the plate members 48A, 48B from each other so as to adjust the area of the aperture formed with the cutouts 48a, 48b. In this case, the plate members 48A, 48B are moved by a diaphragm drive motor 86M as will be described hereinafter and their positions are detected by a diaphragm position sensor 86S. The adjustment of the quantity of light by the variable diaphragm 48 may be controlled by a known method using, for example, the number of moving pulses of the plate members 48A, 48B.

However, as described below, the variable diaphragm 48 of the reading apparatus according to the present invention is not required to have a power (resolving power) to control light quantity very minutely. It is, rather, preferable to control the stopping value quickly by increasing the displacement of plates 48A and 48B (increasing the gain of control) with regard to driving amount (for example, 1 pulse) of diaphragm drive motor 86M, on condition that necessary accuracy is secured.

Moreover, a light quantity controller of read light, which mainly makes corrections of density, according to the present invention is not limited to the variable diaphragm, which can control light quantity continuously, as illustrated in the drawing. Another light quantity controller is also available. It first prepares a plurality of ND filters with different transmission densities, such as density D=0.5, D=1, and D=2, or a ND filter with density decreasing in steps, and then puts a filter with selected density in the optical path of read light when reading is performed.

According to this construction, it is possible to quickly perform the control by the light quantity adjustment means, and to increase the productivity by increasing the reading speed of a film F (scanning transport speed).

According to this construction, it is possible to quickly perform the control by the light quantity adjuster, and to increase the productivity by increasing the reading speed of a film F (scanning transport speed).

Consequently, light incident on the light diffusion box 50 is diffused by the light diffusion plates 50a, 50b and emitted as slit light extending in the same direction as that of the image sensor 68. The length of the slit light is set so that the whole area in the width direction of the film F is satisfactorily irradiated with the light in proportion to the film F of maximum width read by the scanner 12.

As aforesaid, the light source section 28 is located under the work table 32.

The keyboard 24a, the mouse 24b, and the display 26 are mounted on the surface of the work table 32 in such a position that the optical system remains unaffected thereby and a carrier 54 is kept detachable in a predetermined position corresponding to the emission port of the light diffusion box 50.

In the scanner 12, the exclusive carrier 54 which is mountable in the predetermined position of the work table 32 is provided in correspondence with the Advanced Photo System, the negative of 135 in size or the kind and size of the reversal film (strip), and the form of the film such as a strip, a slide and the like. Thus, various films can be dealt with by replacing the carrier 54.

The scanner 12 shown in FIGS. 2a and 2b is used to read the image taken on the film F by means of slit scanning. While held in a predetermined read position corresponding to the emission port of the light diffusion box 50, the film is scan-transported by the carrier 54 in a direction (indicated by the arrow b) perpendicular to the slit (hereinafter called the auxiliary scanning direction) and irradiated with slit-like read light from below, whereby the read light is used to scan the whole surface of the film so as to obtain projection light for carrying the on-film image.

In FIGS. 2a and 2b, the film F is a strip of continuous length on which a plurality of images (frames) can be photographed and the carrier 54 scan-transports the film F in the longitudinal direction of the film F and the auxiliary scanning direction which coincide with each other by the use of carrier rollers 54a, 54b which are disposed with the read position placed therebetween in the auxiliary scanning direction. Thus, the images in the respective frames photographed on the film F are successively read by the scanner 12 with slit-scanning.

Furthermore, the carrier 54 is simultaneously used as a mask for regulating read light incident on the film F and/or the projection light transmitted through the film F in a predetermined slit form.

As is well known in the art, a transparent magnetic recording medium is formed on the film F in the Advanced Photo System. Information concerning the film F such as the kind of film, cartridge ID and the like is magnetically recorded on the magnetic recording medium. Moreover, various items of data including print size, photographed date, the presence or absence of electronic flashing when the photograph is taken, developing date and the like are magnetically recorded as occasion demands at the time of photographing, developing, or printing.

A magnetic information reader is disposed in the carrier corresponding to the film (cartridge) in the Advanced Photo System and when the film is transported to the read position, various kinds of magnetic information are read and sent to the image-processing apparatus 14.

The read section 30 is disposed above the work table 32, and is contained in a casing 56.

An optical frame 58 is installed on the surface of the work table 32 vertically. The casing 56 is supported by the optical frame 58 movably in the direction of bringing the casing 56 into contact with and separating the casing 56 from the work table 32 (i.e., the direction of advancing the focal point of a lens unit 64 and hereinafter called the vertical direction). A mounting table 60 is provided in the casing 56. A plurality of supporting rails 62 are suspended from the mounting table 60. The lens unit 64 is supported by the supporting rails 62 vertically movably.

The lens unit 64 is an image-forming lens unit having a plurality of lenses and used for converting the projection light transmitted through the film F into an image formed on the image sensor 68.

A lens diaphragm 66 is disposed between the lenses of the lens unit 64. The lens diaphragm 66 is an iris diaphragm, for example, and driven by a lens-diaphragm drive motor 92 which will be described hereinafter, whereby to adjust the quantity of projection light to be formed into an image after being passed through the lens diaphragm 66, that is, the lens unit 64.

The image sensor 68 is mounted on the surface of the mounting table 60.

The image sensor 68 has three line CCD sensors having electronic shutter mechanisms, and comprising a number of CCD cells arranged in rows. The line CCD sensors extends in the main scanning direction perpendicular to the auxiliary scanning direction at predetermined intervals from each other in the auxiliary scanning direction. The line CCD sensors are mounted with red (R), green (G) and blue (B) color filters (so-called three lines of color CCD sensors) on the light incident sides of the respective line CCD sensors. Moreover, the charge accumulated in each CCD cell (pixel) of each line CCD sensor is sequentially transferred via the corresponding transfer portion.

Furthermore, a shutter 70 for acquiring data for dark correction of the image sensor 68 is disposed on the upstream side (lower side viewed in FIG. 2a) of the image sensor 68.

Moreover, the number of line CCD sensors of the image sensor 68 according to the present invention is not limited to three. It is possible to utilize various constructions, such as two sensors each of R, G, and B, and two sensors only of line sensors of B. In other words, according to the present invention, it is possible to read images by separating them into three primary colors or more colors utilizing line sensors. In this case, the image sensors in various constructions may be utilized, as far as read conditions of image sensors can be controlled in accordance with the light quantity just like accumulated time of CCD sensors.

Figure 4:
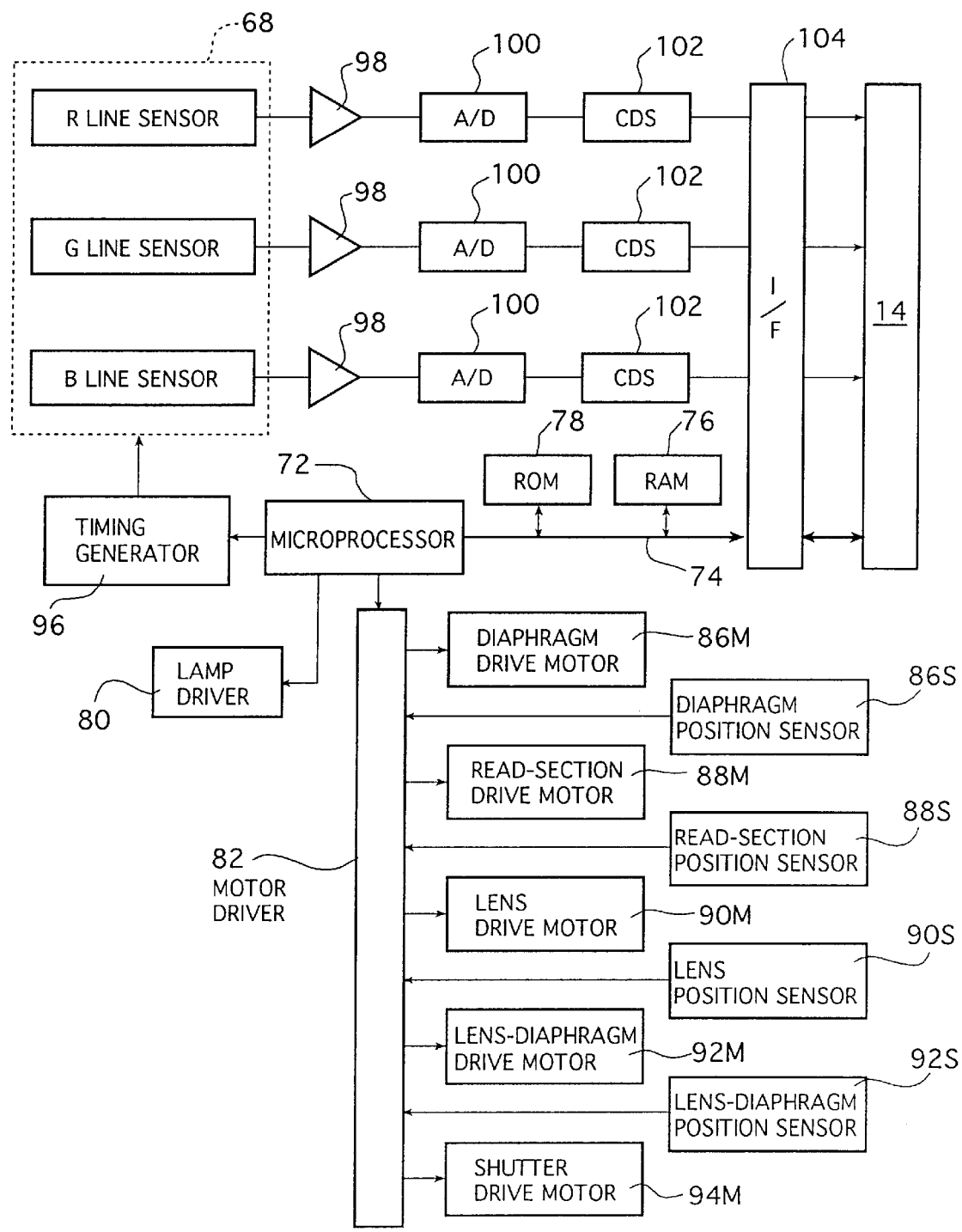
FIG. 4 is a block diagram of an electrical system of the scanner shown in FIGS. 2a and 2b.

FIG. 4 is a schematic block diagram of the electrical system of the scanner 12.

The scanner 12 has a microprocessor 72 for controlling the whole scanner 12. The microprocessor 72 is connected with RAM 76 and ROM 78 (e.g., a rewritable ROM), a lamp driver 80, and also a motor driver, 82 via a bus 74.

The lamp driver 80 operates to switch the light source 36 on and off according to the instruction from the microprocessor 72.

On the other hand, the following component parts are connected to the motor driver 82: a diaphragm drive motor 86M for moving the plate members 48A slidably, 48B of the variable diaphragm 48 so as to adjust; a diaphragm position sensor 86S for detecting the positions of the plate members 48A, 48B of the variable diaphragm 48 (stopping quantity); a read-section drive motor 88M for vertically moving the casing 56 for containing the read section 30; a read-section position sensor 88S for detecting the position of the casing 56 (i.e., read section 30); a lens drive motor 90M for vertically moving the lens unit 64; a lens position sensor 90S for detecting the position of the lens unit 64; a lens-diaphragm drive motor 92M for adjusting the lens diaphragm 66; a lens-diaphragm position sensor 92S for detecting the position of the lens diaphragm 66 (stopping quantity); and a shutter drive motor 94M for switching the shutter 70 between full-closed and full-opened conditions.

When the on-film image is read by the image sensor 68, the microprocessor 72 makes the diaphragm drive motor 86M adjust the variable diaphragm 48 according to the position of the variable diaphragm 48 and the set read conditions in order to adjust the quantity of light incident on the film F, or to adjust the density.

Moreover, the microprocessor 72 determines a zooming magnification according to the designation of the size and variable magnification of the film F. The microprocessor 72 causes the read-section drive motor 88M move the casing 56 vertically according to the position of the casing 56 detected by the read-section position sensor 88S. The microprocessor 72 also causes the lens drive motor 90M move the lens unit 64 vertically according to the position of the lens unit 64 detected by the lens position sensor 90S, so that the projection light transmitted through the film F is formed into an image in the image sensor 68 in conformity with the zooming magnification.

On the other hand, a timing generator 96 for generating various timing signals (clock signals) for operating the image sensor 68, analog/digital (A/D) converters 100 and the like is connected to the image sensor 68.

In the reading apparatus 10 according to the present invention, the accumulat time (electronic shutter speed) of each line CCD sensor of image sensors 68 is individually set in accordance with mainly the color balance of the original images.

As is known in the art, an output signal intensity from a CCD sensor may be controlled by the accumulated time so that even if the sensor receives a same intensity of light, an output intensity varies with the change of the accumulated electric charges (total light quantity) depending on accumulated time. In other words, by changing the accumulated time, a result similar to that achieved by controlling the light quantity of projected light may be obtained.

In the reading apparatus 10, the accumulated time of each line CCD sensor corresponding to R, G, and B reading may be individually controlled in accordance with the conditions of the original images at the main scanning. This enables control of a color balance of images (output image data) by controlling the output intensity of R, G, B individually. For example, in the case of an image, whose green color occupies a large area of a frame like an image photographed on the green of a golf course as described above, it is possible to control a color balance by shortening the period of the accumulated time of the CCD line sensor of G.

In other words, the reading apparatus 10 according to the present invention is provided with a combination of light quantity controllers of read light such as variable diaphragm 48 and other light quantity controllers for controlling the accumulated time of CCD sensors. The former mainly controls the density, and the latter mainly controls the color balance so that whole area of density of original images can be measured over a wide dynamic range, and an image properly controlled of its color balance can be quickly and efficiently obtained.

Density control of an original image, particularly of an image photographed on a film, is necessary to cover a wide range of density so that a large scale control of the light quantity must be done. Though the accumulated time of CCD sensors cannot perform this large scale control, light quantity control of read light by such as a diaphragm can securely control an enough range.

Moreover, the color balance may not be controlled by the light quantity control of read light. However, as described above, control of color balance can be performed by controlling the light quantity each of R, G, and B independently by means of controlling each accumulated time of line CCD sensors. Moreover, control of light quantity by the accumulated time can be performed extremely quickly, accurately, and in high resolving power so that a delicate and minute control of color balance can be performed.

Moreover, since a minute control and a large scale control of light quantity can be performed by means of controlling the accumulated time, and also by means of controlling light quantity of read light respectively, light quantity mechanism capable of quick control such as an increase of control gain of the variable diaphragm 48, as described above, or an application of ND filters in are available. Therefore, it is able to fully control each interval between the frame, though a film transports on a carrier 54 faster, so that image reading with high efficiency can be performed.

Each signal output from the image sensor 68 is amplified by an amplifier 98 before being converted by the A/D converter 100 into digital image data.

The digital image data thus obtained in the A/D converter 100 is processed in a correlated double sampling circuit (CDS) 102 before being sequentially applied to the image-processing apparatus 14 via an interface (I/F) circuit 104. The CDS 102 is used to reduce the image data to image data accurately corresponding to the quantity of accumulated charge in each CCD cell by subtracting field-through data indicating a field-through signal level from the image data.

As photometric signals of R, G and B are outputted from the image sensor 68 in parallel, there are provided three systems each comprising the amplifier 98, the A/D converter 100 and the CDS 102 and image data on R, G and B are outputted in parallel from the I/F circuit 104 as scanning image data.

Figure 5:
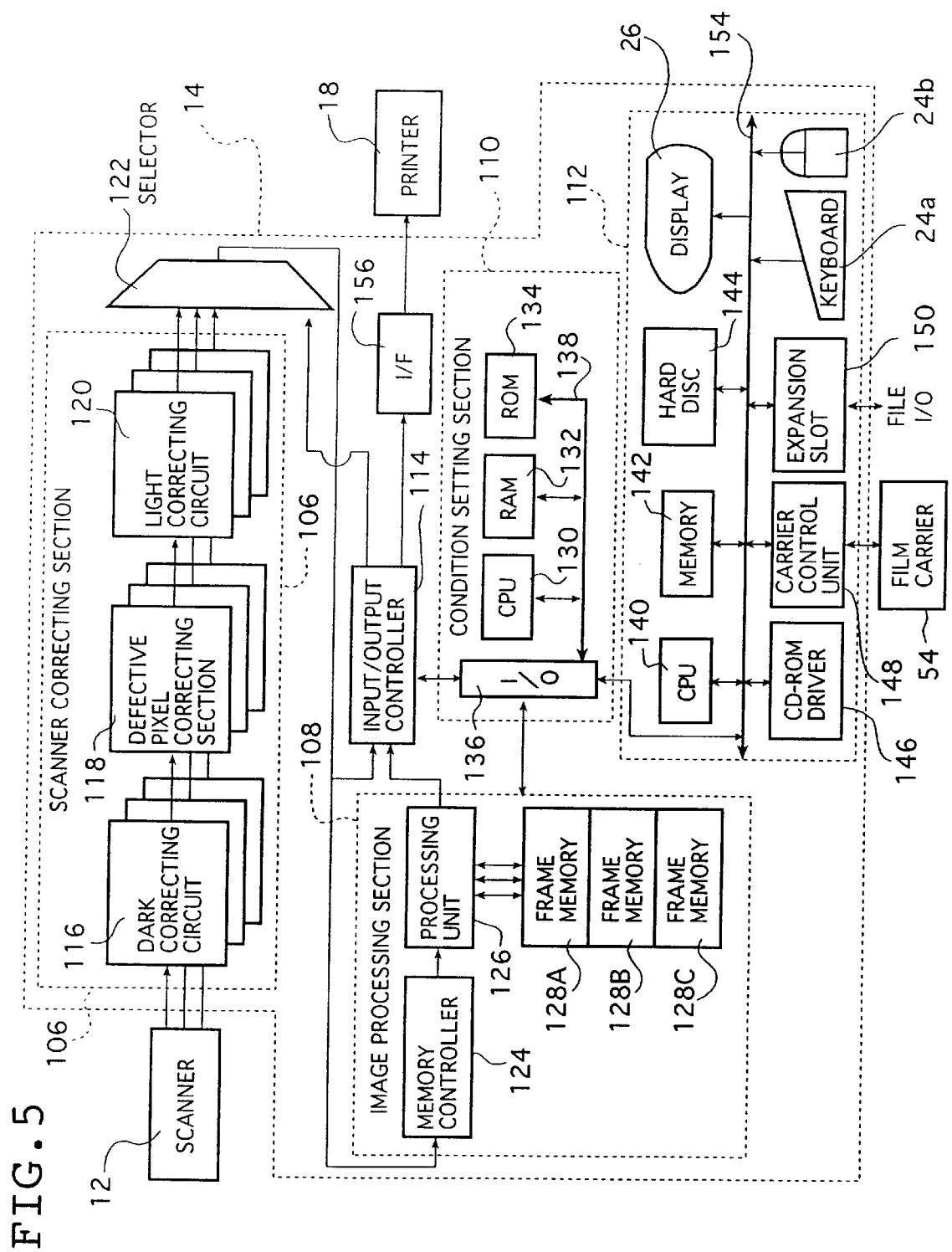
FIG. 5 is a block diagram of an image reading apparatus of the photograph printing and developing machine shown in FIG. 1.

FIG. 5 is a block diagram of the image-processing apparatus 14.

The image-processing apparatus 14 comprises a scanner correction section 106, an image-processing section 108, a condition-setting section 110, a personal computer 112 and an input-output controller 114.

In the scanner correction section 106 exists three signal processing systems each comprising a dark correction circuit 116, a defective pixel correction section 118 and a bright correction circuit 120, the signal processing systems corresponding to image data on R, G, B outputted from the scanner 12 in parallel.

The dark correction circuit 116 is used to correct the dark (current) of the image sensor 68 through the steps of, for example, measuring the image data (data indicating the dark output level of each cell (pixel) of the image sensor 68) outputted from the scanner 12, storing the measured results on a pixel basis and subtracting the data at the dark output level from the image data on the film F outputted from the scanner 12.

The defective pixel correction section 118 is used to correct the defective pixel of the image sensor 68 through the steps of, for example, storing the address of the (defective) pixel regarded as being abnormally outputted from the image data on the adjusting film (reference original) read by the scanner 12 and outputting image data on the defective pixel by interpolating image data on peripheral pixels out of the image data on the film F outputted from the scanner 12.

The bright correction circuit 120 is use d to correct variation of each pixel of the image sensor 68 through the steps of deciding a gain on a pixel basis for correcting variation of each pixel output using the image data on the adjusting film likewise and correcting the image data on the film F outputted from the scanner 12 on a pixel basis according to the gain.

Since the three line CCD sensors are arranged with a space left among them in the auxiliary scanning direction, there is a time lag in timing at which the outputting of the respective image data on R, G and B from the scanner 12 is commenced. In the scanner correction section 106, image-data output timing is delayed at different delay time on a component color basis so that data on R, G, B of the same pixel over the image are outputted simultaneously.

The image data outputted from the scanner correction section 106 is inputted to a selector 122. The input terminal of the selector 122 is also connected to the data output terminal of the input-output controller 114 and the image data supplied from the outside is inputted to the selector 122 from the input-output controller 114.

The output terminal of the selector 122 is connected to the input-output controller 114 and the image-processing section 108. The selector 122 selectively feeds the supplied image data into the input-output controller 114 and the image-processing section 108.

The image-processing section 108 comprises a memory controller 124, a processing unit 126 and three frame memories 128A, 128B, 128C Each of the frame memories 128A, 128B, 128C has a capacity of storing image data equivalent to one frame and the image data fed from the selector 122 is processed in the processing unit 126 and sent to the input-output controller 114 or stored in one of the three frame memories 128 as the need arises. The memory controller 124 controls addresses when image data is stored in each frame memory 128 so that pixels of the image data thus fed in are stored in such a manner that they are lined up in predetermined order in the storage area of the frame memory 128.

The processing unit 126 subjects image data for the main scanning to predetermined image processing including, for example, gray (color) balance adjustment, gradation correction, density correction (brightness correction), provision of dodging effect (compression/extension of density dynamic range), color saturation correction, sharpness processing and the like in order to create output image data.

These sorts of processing is performed by a known method in which arithmetic operations, processing with LUT (look-up-table), processing with filters and the like are properly combined, and processing conditions (setting of operational coefficients, preparation for LUT and MTX operations) together with image read conditions for the main scanning are set in the condition-setting section 110.

The processing unit 126 is connected to the input-output controller 114 and the image data subjected to image processing is fed into the input-output controller 114 or otherwise fed into the input-output controller 114 at predetermined timing after being stored in the frame memory 128 once.

According to the apparatus illustrated in the drawing, reading of an image in each frame photographed on the film F is carried out twice; one by pre-scanning with low resolution, the other by main scanning with high resolution.

The pre-scanning is carried out by reading the film F with the pre-scanning image read conditions in which such as the accumulated time of the line CCD sensor, and the stopping value of the variable diaphragm 48 have been set lest the output of the image sensor 68 should be saturated even when the density of the image photographed on the film F is extremely low (for example, under exposed negative image).

The image data obtained from the pre-scanning (pre-scanning data) is inputted to the input-output controller 114 from the selector 122 and then supplied from the input-output controller 114 to the condition-setting section 110.

The condition-setting section 110 comprises CPU 130, RAM 132, ROM 134 (e.g., ROM whose storage contents are rewritable) and an input-output (I/O) port 136. These are configured to connect with each other via a bus 138. The condition-setting section 110 extracts data (pre-scanning image data) in the area of each frame (image) of the film based on the pre-scanning data input from the I/O controller 114. Moreover, while this section 110 detects the position of a frame, this section 110 sets the image processing and read conditions of each frame, and also read conditions (of images) at the main scanning.

More specifically, in the condition-setting section 110, preparation of a density histogram and calculation of the quantity of image characteristics including mean density, LATD (Large Area Transmission Density), highlight (lowest density), shadow (highest density) and the like are carried out with respect to the pre-scanned image data frame by frame.

From these results, conditions of an original image are judged. Then, the accumulated time of a line CCD sensor each of R, G, and B is calculated in a manner as described above so as to properly arrange a color balance of the image data (original image) on each frame outputted from an image sensor 68 when a main scanning is performed. Moreover, a stopping value of the variable diaphragm 48, which saturates the output from image sensor 68 at a little lower density than the lowest density of original image, is calculated. Then, these calculated values are set as the reading conditions of the main scanning.

Moreover, if the ND filter changing density in steps as described above is employed as a light quantity control means of read light, the accumulated time of a line CCD sensor is arranged such that the output is saturated in the same manner as described above, in order to perform a color balance and to fill out the gaps between steps of light quantity of read light.

Furthermore, the condition-setting section 110 sets image processing conditions of each frame such as the aforesaid gray balance adjustment, brightness correction according to the indication of an operator employing an operating system 24, if necessary, as well as the quantity of image characteristics.

In case of the examination of the image of a frame on a film, the condition-setting section 110 first sets the image processing conditions and reading conditions, and then outputs the thus set image processing conditions and the pre-scanned image data into personal computer 112. The image in this case is displayed on the display 26 connected to the personal computer 112 as a simulation image.

When the image-processing conditions are definitely decided, the condition-setting section 110 supplies the image processing-conditions thus decided to the processing unit 126 of the image-processing section 108 and also supplies the position and read conditions of each detected frame to the microprocessor 72 of the scanner 12. The microprocessor 72 adjusts the accumulated time of each line CCD sensor and/or the stopping value of the variable diaphragm 48 according to the frame-to-frame read conditions supplied at the time of the main scanning and reads the image according to the supplied information concerning the position of each frame.

The personal computer 112 (hereinafter called PC 112) comprises CPU 140, a memory 142, a hard disc 144, a CD-ROM driver 146, a carrier control unit 148 and an expansion slot 150, these being connected via a bus 154. The keyboard 24*a* and the mouse 24*b* are also connected to the bus 154.

The carrier control unit 148 is connected to the carrier 54 and used to control the transport of the film F by the carrier 54. In a case where the carrier 54 is adapted for the Advanced Photo System, the information read by the carrier 54 from the magnetic recording medium of the film is inputted to the image-processing apparatus 14 from the carrier control unit 148.

Moreover, a driver for reading/writing data from/to a recording medium such as a memory card, a apparatus (not shown) for communicating with any other information processing equipment and the like are connected to the PC 112 via the expansion slot 150.

When the image processing conditions set in the condition-setting section 110 are examined as aforesaid, the pre-scanned image data and the set image processing conditions are supplied to the PC 112. In the PC 112, the pre-scanned image data of each frame is processed under corresponding image processing conditions and a simulation image is displayed on the display 26.

During the time the image processing conditions are examined, image adjustment is chiefly designated through the keyboard 24*a*. In the PC 112, the image processing conditions are adjusted (modified) in accordance with the designation of adjustment and the simulation image displayed on the display 26 is modified accordingly and besides information concerning the designation of image adjustment is supplied to the condition-setting section 110. The image processing conditions are also adjusted in the condition-setting section 110 according to the designation of adjustment.

The input-output controller 114 is connected to the printer 18 via an I/F circuit 156.

When the image data subjected to image processing is used for image recording on the photosensitive material in the printer 18, the output image data subjected to the image processing in the image-processing section 108 is supplied to the printer 18 as output image data via the I/F circuit 156 from the input-output controller 114. When the image data is outputted outside as an image file, the image data subjected to the image processing in the image-processing section 108 is supplied to the PC 112 via the condition-setting section 110 from the input-output controller 114.

The output apparatus 22 which comprises the printer 18 and the processor 20 records a latent image by exposing photosensitive material (photographic paper) according to the image data outputted from the image-processing apparatus 14 (input apparatus 16) and outputs a print (finish) by subjecting the latent image to predetermined developing processing.

The printer 18 is used, for example, to record the latent image by subjecting photosensitive material in the form of a cut sheet to light beam scanning exposure by following the steps of cutting the photosensitive material in lengths for preparing prints, recording back prints, modulating light beams of three kinds for R, G and B exposure corresponding to the spectral sensitivity characteristics of the photosensitive material according to image data (recording image) to deflect the beams in the main scanning direction, transporting the photosensitive material in a pre-scanning direction intersecting the main scanning orthogonally in order to record the latent image by subjecting the photosensitive material to two-dimensional scanning exposure using the light beams and sending the exposed photosensitive material to the processor 20.

In the processor 20, predetermined wet developing processing including coloring development, bleach-fixation, washing and the like is applied to the supplied photosensitive material in order to convert the latent image to a visible image, which is subsequently dried to make a print, and then the prints are sorted out and stacked up by lots equivalent to a roll of film.

A detailed description will subsequently be given of the image input apparatus according to the present invention by explaining the function of the photograph printing and developing machine 10.

The photograph printing and developing machine 10 is started and the carrier 54 corresponding to a film F to be read is mounted in a predetermined position of the work table 32. The operator makes sure that the input apparatus 16 is in the predetermined state with reference to, for example, the quantity of light from the light source 36 and mounts the film F (cartridge in the case of the Advanced Photo System) for use in making prints in the predetermined position of the carrier 54.

When the carrier 54 confirms the fitting of the film F, the scanner 12 enters a pre-scanning mode wherein the stopping value of the variable diaphragm 48 and the accumulated time of each line CCD sensor of the image sensor 68 are set by a microprocessor 72 according to the predetermined pre-scanning read conditions.

Simultaneously, the casing 44 and the lens unit 64 are vertically moved according to the film size and the print size so as to adjust the magnification.

When the scanner 12 reaches a state corresponding to pre-scanning, the carrier 54 starts scan-transporting the film F at the pre-scanning speed in the auxiliary scanning direction and the read light emitted from the light source 36, adjusted by the variable diaphragm 48 and diffused by the light diffusion box 50 is incident on the film F held in the predetermined position by the carrier 54. Then the projection light is formed into an image in the image sensor 68 by the lens unit 64 and the image is photoelectrically read by each of the line CCD sensors of R, G and B.

As aforesaid, the read light is slit light extending in the main scanning direction and since the film F is transported in the auxiliary scanning direction intersecting the main scanning direction coinciding with the longitudinal direction, the film F is two-dimensionally scanned by the slight light. The pre-scanning is performed from the leading end of the film F to its trailing end of reading position while the film F is transported continuously. Consequently, the whole surface of the film F is scanned by the read light and the image is wholly read by the image sensor 68.

The output signal of the image sensor 68 is amplified by the amplifier 98, converted by the A/D converter 100 into digital image data, corrected by the CDS 102 and sent from the I/F circuit 104 to the image-processing apparatus 14 as the pre-scanned data.

The pre-scanned data sent to the image-processing apparatus 14 is subjected to dark correction, defective pixel correction and bright correction in the scanner correction section 106, fed into the input-output controller 114 by the selector 122 and sent to the condition-setting section 110.

In the condition-setting section 110, the image data of each frame, that is, the pre-scanned image data of each frame is extracted from the pre-scanned data so as to detect the frame position, to prepare the density histogram, and to calculate the quantity of image characteristics frame by frame. As described above, the accumulated time of each line CCD sensor, and the stopping value of the diaphragm 48 are calculated such that density and color balance controls in accordance with an original image in each frame are performed. Based on these calculations, the read conditions is set and image processing conditions of each frame are also set.

When the image processing conditions of the image read by pre-scanning are examined by the operator, the pre-scanned image data with the set image processing conditions is sequentially sent to the PC 112.

In the PC 112, the pre-scanned image data thus received is processed according to the corresponding image processing conditions and the image thus processed is displayed on the display 26 as a simulation image to be reproduced on a print.

The operator makes the examination while looking at the simulation image displayed on the display 26. The operator also can adjust the image frame by frame using adjusting keys of the keyboard 24a, for example, a density adjusting key, a color adjusting key, a γ (gradation) adjusting key, a sharpness adjusting key as the occasion demands. Accordingly, the previously set image processing conditions are adjusted (corrected) and simultaneously the simulation image displayed on the display 26 is also varied.

When the operator decides that the image of the frame involved is appropriated (examination OK), he designates the termination of examining the image of the frame and examines the image of the next frame.

When examining the image of the all frames of a roll of film is thus terminated, the operator designates the commencement of the printing operation. By the above designation, the image processing conditions and the read conditions at the time of the main scanning are definitely decided frame by frame and the position and the image processing conditions of each frame are sent to the processing unit 126 of the image-processing section 108 and the read conditions to the microprocessor 72 of the scanner 12.

Subsequently, the carrier 54 starts transporting the film F at a speed corresponding to the main scanning and carries out the main scanning. Transporting the film F at the time of the main scanning may be directed opposite to the pre-scanning direction or directed in the same direction as the pre-scanning direction by rewinding the film F after the pre-scanning is terminated.

In the input apparatus 16 according to the present invention, it does not necessarily require the operator to make such an examination, but may be allowed to make a print without the examination. At this time, the image processing conditions are definitely decided at a point of time that the image processing conditions and the read conditions at the time of the main scanning are set in the condition-setting section 110 and then the main scanning is carried out. When the examination is not made by the operator, moreover, the simulation image may not be displayed on the display 26.

The presence or absence of the examination is preferably made selectable as a working mode.

When the main scanning is started, designation is sent from the microprocessor 72 to a motor driver 82, and the stopping value of the variable diaphragm 48 is adjusted according to the read conditions of a frame, before the frame is transported to the read position. When the frame is transported to the read position, the frame is detected from information concerning the position of the frame thus transferred. Then, the microprocessor 72 sends a designation to a timing generator 96 so as to drive each line CCD sensor at the accumulated time in accordance with read conditions of the frame, and thus the image reading is performed.

During the interval (between frames) after the first frame has been completely read and before the second frame is transported to the read position, the stopping value of the variable diaphragm 48 is adjusted by the microprocessor 72 according to the read conditions of the second frame. When the second frame is transported to the read position, each line CCD sensor is driven at the accumulated time according to read conditions of each frame and the image reading of the second frame is performed, in the same manner as described above. An image of the third frame and thereafter are successively read likewise.

The image data outputted from the scanner 12 is processed in the scanner correction section 106 and then sent by the selector 122 to the image-processing section 108 where the image data is subjected to the image processing according to the image processing conditions set to correspond to each frame. Output image data resulting from a series of steps as described above is sent from the input-output controller 114 via the I/F circuit 156 to the printer 18.

On receiving the output image data, the printer 18 operates to record the back print and form the latent image by subjecting the photosensitive material to the scanning exposure with the light beam modulated according to the image data, whereby to transport the latent image to the processor 20 as described above.

The exposed photosensitive material transported to the processor 20 is subjected to the predetermined processing including the wet developing processing, drying and the like and outputted as a print. Then the prints are sorted out and stacked up.

Although the main scanning is carried out after the whole frame photographed on the film F has been pre-scanned and examined in the aforesaid embodiment, the present invention is not limited to the arrangement above but may be implemented so that a plurality of frames as prescribed, namely, six frames and solon are pre-scanned and examined before being subjected to the main scanning at a time or otherwise processing is performed frame by frame.

The present invention is not limited to the aforesaid embodiment though a detailed description has been given of the image reading apparatus according to the present invention but may needless to say be modified and improved in various manners without departing from the spirit and scope of the invention.

For example, in the exemplary apparatus, light quantity control of read light has been performed by employing a variable diaphragm or a ND filter. However, for example, in a apparatus having color filters for controlling a color balance of read light, each color filter may be put to act in the optical path of light of read light and then perform light quantity control of read light.

As set forth above in detail, the digital image reading apparatus by slit scanning according to the present invention is capable of performing efficiently the appropriate image reading that is adjusted to have a wide dynamic range and a good color balance in accordance with the original image and also capable of outputting a reproduced image of high quality at constantly high productivity by such as a digital photoprinter.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. An image reading apparatus for reading an original image photoelectrically comprising:

a light source for irradiating read light on an original including the original image;

a light quantity controller, disposed between said light source and the original in a read light path, for variably controlling a quantity of read light incident on said original during photoelectrical reading;

an image sensor including a plurality of line sensors, each line sensor corresponding to one of a plurality of colors containing three primary colors and including a plurality of photoelectric transducing elements arranged in a direction; and an adjusting means for adjusting read conditions at said image sensor for each line sensor, independently.

2. The image reading apparatus as claimed in claim 1, wherein said light quantity controller mainly controls density of the original image, while said adjusting means mainly adjusts color balance of the original image.

3. The image reading apparatus as claimed in claim 1, wherein the read conditions adjusted by said adjusting means relate to light quantity, and wherein said adjusting means has a higher resolving power than the light quantity control by said light quantity controller.

4. The image reading apparatus as claimed in claim 1, further comprising a color adjusting means for adjusting color components of said read light.

5. The image reading apparatus as claimed in claim 1, wherein said light quantity controller includes a diaphragm.

6. The image reading apparatus of claim 5, wherein the diaphragm includes two pieces, moved to vary an area of an aperture therebetween to thereby control a quantity of read light.

7. The image reading apparatus of claim 5, wherein each line sensor is a line CCD sensor, and wherein said adjusting means adjusts respective accumulated times of the line CCD sensors to control color balance.

8. A digital photoprinter including the image reading apparatus of claim 1.

9. The image reading apparatus of claim 1, wherein each line sensor is a line CCD sensor, and wherein said adjusting means adjusts respective accumulated times of line CCD sensors to control color balance.

10. The image reading apparatus of claim 1, wherein said adjusting means includes filters for adjusting color components of light.

11. The image reading apparatus of claim 10, wherein the filters are located proximate to the light source.

12. The image reading apparatus of claim 1, comprising:

a scanner, for relatively moving said original and an optical scanning system.

13. The image reading apparatus of claim 12, comprising:

a holder for holding said original in a predetermined read position.

14. The image reading apparatus as claimed in claim 13, wherein said original is a photographic strip of film, wherein said holder and said scanner compose a film carrier that moves said photographic strip of film in its longitudinal direction, coincident with an auxiliary scanning direction while holding said photographic strip of film on said read position, and that is loaded on and unloaded from a predetermined position.

15. The image reading apparatus of claim 14, wherein the scanner is a slit scanner.

16. The image reading apparatus of claim 12, wherein the scanner is a slit scanner.

* * * * *